United States Patent Office 3,366,578
Patented Jan. 30, 1968

3,366,578
ZEOLITE AND METHOD FOR MAKING THE IMPROVED ZEOLITE
Edward Michalko, Chicago, Ill., assignor to Universal Oil Products Company, Des Plaines, Ill., a corporation of Delaware
No Drawing. Filed Dec. 7, 1964, Ser. No. 416,625
14 Claims. (Cl. 252—455)

ABSTRACT OF THE DISCLOSURE

A synthetic zeolite particle having two or more different sized effective pore entrance diameters within a single particle, exemplified by a particle containing both a Type A and a Type X structure. The zeolite is prepared by contacting a preformed refractory oxide particle of silica, alumina or silica-alumina with a treating solution of predetermined composition containing alkali metal cations and hydroxyl, silicate and/or aluminate anions. The refractory oxide particle is converted to a mixed type zeolite particle without substantial change of its original size and shape.

---

This invention relates to a novel method of producing synthetic zeolites which, upon dehydration yield an adsorbent of controlled pore diameter commonly known as a molecular sieve. More specifically, this invention relates to a method for producing the solid molecular sieve in an attrition-resistant aggregate form of desired shape as opposed to prior art methods of producing pulverulent masses. Still more specifically this invention relates to a method of producing a molecular sieve without the use of a binder to hold the zeolite crystals together. Further this invention relates to a method of preparing a synthetic zeolite particle having at least two different sized uniform pore entrance diameters.

This invention also relates to a novel synthetic zeolite having two different sized uniform pore entrance diameters. This invention still further relates to synthetic zeolites of desired shape having at least two different sized uniform pore entrance diameters. More specifically, this invention relates to synthetic zeolites of substantially spherical shape in any desired size having at least two different sized uniform pore entrance diameters.

In one of its embodiments this invention relates to a method of preparing a mixed type synthetic zeolite particle having a predetermined size and shape which comprises preparing a solid refractory inorganic oxide particle of said size and shape comprising an oxide selected from the group consisting of silica and alumina, bringing said particle into contact with an aqueous treating solution containing alkali metal cations and anions selected from the group consisting of hydroxyl, silicate and aluminate, the composition of said treating solution being established in relation to the original composition of said particle to incorporate the desired concentration of each of said type in the finished zeolite, maintaining said particle in contact with said treating solution until it is substantially converted to a zeolite particle of approximately said size and shape having the desired concentration of each of said types, and separating the zeolite particle from the treating solution.

In another of its embodiments this invention relates to a method of preparation of binderless synthetic zeolite particles of a predetermined size and shape having more than one effective pore entrance diameter which comprises preparing a solid refractory oxide particle of said size and shape comprising an oxide selected from the group consisting of silica and alumina, bringing said particles into contact with an aqueous treating solution containing alkali metal cations and anions selected from the group consisting of hydroxyl, silicate and aluminate, the composition of said treating solution being established in relation to the original composition of said particle to establish the conversion of refractory oxide to more than one crystal zeolite structure within the particles, maintaining said particles in contact with said treating solution until it is substantially converted to zeolite particles, and separating the zeolite particles from the treating solution.

In another of its embodiments this invention relates to a synthetic crystalline material comprising the elements silicon, aluminum, oxygen and at least one cation having a valence of not more than three, having uniform pore entrance diameters, the number of different sized diameters being at least two.

Molecular sieves have become increasingly important in the field of adsorbents in the past few years. The sieves are of crystalline structure having many small cavities connected by still smaller entrance pores of uniform size. These pores may vary in size from about 3 angstrom units up to about 12 or 15 or even more angstrom units. However, a particular molecular sieve material generally will have a uniform pore entrance size. These crystalline aluminosilicate materials are chemically similar to clays and feldspars and belong to the class of materials called zeolites. Zeolites vary somewhat in composition although they generally contain aluminum, silicon, oxygen and alkali or alkaline earth metal. The zeolites may be dehydrated without the destruction of the crystal structure leaving an interlaced crystal structure of regularly spaced channels.

There are a number of commercially available molecular sieves, each having one particular pore entrance size. Thus, for example, the sodium form of Type A has a nominal pore entrance size of 4 angstrom units, the calcium form of Type A has a nominal 5 angstrom pore entrance size, the calcium form of Type X has a nominal 10 angstrom pore entrance size, the sodium form of Type X has a nominal 13 angstrom pore entrance size, etc. Type A zeolite is further described in U.S. Patent No. 2,882,243 while Type X is further described in U.S. Patent No. 2,882,244. It is within the scope of this invention to produce a zeolite particle having both a Type A and a Type X crystal structure in varying percentages. Thus, for example, a particle may be prepared containing 20% Type A and 80% Type X, 50% Type A and 50% Type X, 75% Type A and 25% Type X, etc.

Molecular sieves are useful in many applications such as the removal of water from various materials, the separation of hydrocarbon molecules by molecular size selectivity of the zeolite, the removal of trace quantities of hydrocarbons from gas or liquid streams, etc. It is in the latter application that the zeolites produced by the process of this invention find particular usefulness. For example, when introducing substantially pure ethylene or an ethylene-nitrogen stream and benzene into a catalytic alkylation reactor to form ethylbenzene, trace quantities of other hydrocarbons plus any water must be removed from the ethylene stream in order to attain high purity product and to maintain catalyst stability. This may be accomplished by passing the ethylene stream through a guard bed containing both Type A and Type X molecular sieves. Previously, the guard bed would be loaded first with Type A until it was about half full and then filled with Type X. In this manner, the Type A sieve would remove the water and the Type X would remove any remaining trace hydrocarbons. The present invention allows a single loading of a mixed type sieve thus simplifying the loading procedure while allowing uniform sorption of the undesirable components.

The method herein described may be used to produce alkaline earth metal zeolites by one additional step, namely, the replacement of alkali metal ions with alkaline earth metal ions after the alkali metal zeolite has been produced. This can be accomplished by well known methods of ion exchange as for example, soaking the alkali metal zeolite particles in a finishing solution containing the desired alkaline earth metal ions. Thus, for example, the method of this invention can produce a mixed 4A and 13X sodium molecular sieve of a predetermined size and shape. The particles may then be ion exchanged with a finishing solution containing calcium ions to produce a 5A and 10X molecular sieve.

Mineral sorbents are widely used both in fluid bed and in fixed bed processes in which the sorbent is desired in the form of porous particles rather than powdered masses. In fixed bed processes sorbents of from 8 mesh to 70 mesh in size are preferable whereas in fluid processes sorbents of from 100 to 200 or even 350 mesh in size are preferable. Some gas stream beds of sorbents employ a very coarse size particles in the 4 to 10 mesh size range. The use of particles in substantially spherical or spheroidal shape offers numerous advantages, particularly when the particle is used as an adsorbent, treating, refining or purifying agent or as a catalyst or component of a catalyst for the conversion of organic compounds and still more particularly for the conversion or separation of hydrocarbons. When used as a fixed bed of packing material in a reaction or adsorption contacting zone, the spheroidal or spherical shaped particles permit more uniform packing and thereby reduce variations in pressure drop through the bed and accordingly reduce channelling which otherwise results in a portion of the bed being by-passed. Another advantage in the use of particles of spherical shape is that the spheres contain no sharp edges to break or wear off during processing or handling and therefore reduce the tendency to plug the process equipment. These advantages are magnified when the particles are used as a moving or fluid bed, that is when the particles are transported from one zone to another by either the reactants or by an extraneous carrier medium. It is thus seen that the use of particles in this shape permits a more effective utilization of these particles.

The present methods of producing synthetic zeolites are not satisfactory in either producing particles of desired coarseness or size or of desired shape. Prior art methods typically produce synthetic zeolites in a finely divided powdered form ranging in size from 0.5 to 5 microns. In order to obtain the zeolites in a useful size the powdered zeolite is agglomerated with a binder such as a clay to produce particles of desired size. These particles are typically produced in pellets or beads of non-uniform size or shape through methods such as extrusion. In order that the particles be of sufficient hardness binders up to 20 or more weight percent of the total particle are employed. This results in a heterogenous mixture of zeolite and binder in which the binder contributes nothing to the zeolite particle as a sorbent but instead occupies valuable space in the particles. Probably the binder results in poor zeolite particles as the binder may tend to plug some of the pores that otherwise interfere with the sorbent activity. The method of this invention can produce synthetic zeolites of any desired size and shape without the use of binders. Another disadvantage of producing zeolite crystals 0.5 to 5 microns size range is the difficulty in handling these crystals before the binders are added such as separating the fine crystals from the reaction medium.

It is an object of this invention to produce a mixed type zeolite which has the above mentioned desirable size and shape while obviating the above mentioned difficulties.

It is another object of this invention to produce synthetic mixed type zeolites directly in the form of useful aggregate size and desired shape as contrasted with prior art powdered form.

Still another object of this invention is a method of producing a hard coherent mixed type zeolite particle of desired size and shape without the use of extraneous binding material.

It is still another object of the present invention to produce a binderless synthetic zeolite particle of a predetermined size and shape having more than one uniform pore entrance diameter.

It is a more specific object of this invention to prepare a synthetic zeolite particle of a substantially spherical shape having at least two different sized uniform pore entrance diameters.

Another specific object of this invention is an improved mixed type zeolite useful as a catalyst support in catalyzing selective reactions. These and further objects and advantages will become apparent to one skilled in the art and are within the scope of this invention.

One of the starting materials in the process of this invention are solid particles of desired size and shape composed of silica, alumina or mixtures in any proportion of silica and alumina. Methods for producing any of these three alternative starting materials are well known in the prior art. For example, commercial fluid catalytic cracking catalyst particles have been produced for many years in the 100 to 300 mesh size range containing silica and alumina of several compositions. This commercially available fluid cracking catalyst may be converted to mixed type zeolites by employing the process of this invention.

Methods of producing alumina, silica and silica-alumina particles have long been known in the prior art. For example, U.S. Patent No. 2,270,090 shows a method for manufacturing silica-alumina particles. Likewise U.S. Patent Nos. 2,285,314, 2,285,396, 2,382,951 and 2,526,907 all disclose methods or improvements in the manufacture of silica-alumina particles. These particles have long been recognized as having the ability to crack hydrocarbon molecules and many attempts have been made to produce catalytically active particles for use in such a reaction zone. U.S. Patent Nos. 2,462,236, 2,733,220, 2,645,619 and 2,672,453 disclose methods and/or improvements in the manufacture of silica particles. U.S. Patent Nos. 2,620,314, 2,703,315 and 2,865,866 disclose methods and improvements in the manufacture of alumina particles. Also the manufacturing of the above mentioned particles in certain sizes and shapes is well known in the prior art. For example, U.S. Patent Nos. 2,442,884 and 2,733,220 disclose methods and/or improvements in the manufacture of inorganic oxides in spherical form. It is apparent that silica particles, alumina particles and silica-alumina particles can be produced in all sizes and shapes in view of the extensive knowledge of their production in the prior art. There is little point in describing in great detail their preparation since these three kinds of particles are readily available in the commercial market and preparation thereof is only remotely related to this invention. Any of the three particles can be obtained in the desired size and shape without difficulty.

Typically silica particles may be produced in the following manner. Water glass or silica frits are commercially available and are diluted in water to give concentrations in the order of 16% SiO$_2$. This solution is added to an acid such as HCl or H$_2$SO$_4$ to give a solution of a pH less than 4. Hexamethylenetetramine is added to the silica sol and the resulting mixture may be dropped into a forming oil at a temperature less than 100° C. in discrete particles resulting in hydrogel particles. Various dropping techniques are known to produce hydrogel spheres of desired size. The hydrogel particles are aged typically to temperatures in the range of 90° C. to 150° C. in the forming oil, then water washed to remove salts, dried at temperatures in the range of 150° C. to 250° C. and finally calcined at temperatures in the range from 350° C. to 700° C. The resulting silica particles are then ready to be contacted with the aqueous treating solution described herein. Said resulting mixture may also be precipitated to form a hydrogel and extruded into pellet type particles of a given size. Resulting pellets may then be kept dried and calcined as described above.

Typically, silica-alumina particles may be produced in the following manner. A silica sol is prepared as described. An alumina sol is prepared by digesting substantially pure aluminum pellets in HCl and conditions such that the aluminum to chloride rate ratio is substantially in the range of 1.0 to 1.4. The silica sol and the alumina sol are mixed together in such proportions as to give the ultimate desired SiO/Al$_2$O$_3$ ratio, urea and hexamethylenetetramine are added and the resulting mixture dropped into a forming oil at temperatures less than 100° C. in discrete particles resulting in hydrogel particles. Again the size and shape of the hydrogel particles may be controlled by well known methods. The aging, washing, drying and calcining steps as described above are repeated to form the desired silica-alumina particles. The resulting silica-alumina particles are then ready to be contacted with the aqueous treating solution described herein. The silica-alumina particles may also be extruded into pellets, dried and calcined as described above.

Typically, alumina particles may be produced in the following manner. An alumina sol is prepared as described above. Hexamethylenetetramine and urea are added to the alumina sol as sources of ammonia for gelation and subsequent neutralization of the sol. This resultant mixture is dropped into a forming oil at temperatures less than 100° C. in discreet particles resulting in hydrogel particles. The size and shape of the hydrogel particles may be controlled by well known methods. The aging, washing, drying and calcining steps as described above are repeated to form the desired alumina particles. The resulting alumina particles are then ready to be contacted with the aqueous treating solution described herein. The alumina particles may also be extruded into pellets dried and calcined as described above.

In all three cases it is preferable to first calcine the particle before contacting it with the aqueous treating solution. The calcination step is important in determining the strength and density of the finished zeolite particles. The dried but uncalcined particles may also be converted to zeolites but generally these result in zeolite particles having less strength which are more easily crushed than those zeolites formed from the calcined particles. The washed but undried and uncalcined particles tend to disintegrate on contact with the aqueous treating solution thus destroying the desired size and shape of the particles. In general, it is preferable to calcine the particles at temperatures of 350° to 700° C. in the presence of air for a period of time sufficient to obtain particles of desired strength and density. The calcined particles are then contacted with the treating solution as described herein.

Dropping techniques are well known to produce spherical shape particles which, when finished, will have nominal diameters in the range of from 1/64 to 1/4 of an inch. Spray drying techniques are also well known to produce particles in the size range of 50 to 350 mesh. Such latter methods are commonly employed in the commercial manufacture of fluid catalytic cracking catalyst.

The next step in this process involves the contacting of one of the above three types of refractory oxide particles with an aqueous treating solution containing alkali metal cations and anions selected from the group consisting of hydroxyl, silicate and aluminate, the composition of said treating solution being established in relation to the original composition of said particles to establish the conversion of the refratcory oxide to more than one crystal zeolite structure within the particles. It has been found that when one of the above mentioned three calcined particles having a definite size and shape has been reacted with the treating solution, a molecular rearrangement and reaction occurs within the particle thus forming a mixed type zeolite having substantially said definite size and shape. Therefore, the size and shape of the produced zeolite is substantially the size and shape of the starting particle and the produced zeolite has more than one sized pore entrance diameter. The contacting step should be carried out at temperatures of from 25° C. to 150° C. and preferably 50° C. to 120° C. Generally, the higher the temperature, the shorter is the required contacting time. The contacting times vary from a few minutes to several days although preferable times vary from 2 or 4 hours up to 24 hours. It is desirable that the treating solution have a pH, greater than 10 and preferably greater than 12, in order to effectively and rapidly rearrange the molecular structure into the zeolite crystal.

The desired products of this process is a crystalline synthetic material having a composition expressed in terms of oxide as follows:

$$0.95 \pm 0.2 M_{2/n}O : Al_2O_3 : 2.2 \pm 0.5 SiO_2 : YH_2O$$

wherein M represents at least one cation having a valence of not more than 3, $n$ represents the valence of M, and Y may be any value up to about 8, the atoms of said material being arranged in a unit cell having at least two distinct crystalline patterns. One factor in the determination of the zeolite types is the silica to alumina ratio. Thus, in the formation of a given mixed type zeolite, the starting particle and the treating solution must give to the finished zeolite a molecular ratio of silica to alumina to result in said given mixed type. This means that the concentration of silicate and/or aluminate in the treating solution is adjusted, in relation to the concentration of silica and/or alumina in the starting particle, to provide the proper silica to alumina ratio in the finished zeolite. A convenient method of accomplishing this is to contact a silica-alumina particle having approximately the desired molecular ratio of silica to alumina with an aqueous treating solution comprising sodium hydroxide. The silica to alumina ratio may be changed to give any desired mixed type of zeolite.

It is within the scope of this invention that the cations of the treating solution comprise sodium, potassium and lithium. In order to form a mixed type 4A-13X zeolite, sodium cations are utilized in the treating solution and said solution would comprise compounds selected from the group consisting of sodium silicate, sodium aluminate and sodium hydroxide. Likewise, the potassium or even the lithium cations could be used. These alkali metal cations are sutiable to achieve the desired high pH of the treating solution.

The anions of the treating solution are selected from the group consisting of hydroxyl, silicate and aluminate. The composition of the anions in the treating solution is established in relation to the original composition of the solid particles to incorporate silica and alumina in the finished mixed type zeolite in the desired amounts. For example, it may be desired to have a finished mixed type zeolite having a molecular ratio of silica-alumina of 2.2/1.0. This can be accomplished by any of the following four methods: (1) obtain silica-alumina particles having said 2.2/1.0 ratio already present and use sodium hydroxide as the active component of the treating solution; (2) obtain silica particles and use sufficient sodium aluminate and excess sodium hydroxide as the active component of the treating solution to achieve the desired 2.2/1.0 ratio; (3) obtain alumina particles and use sufficient sodium silicate and excess sodium hydroxide as the active component of the treating solution to achieve the desired 2.2/1.0 ratio; and (4) obtain silica-alumina particles not having the desired 2.2/1.0 molecular ratio and use a treating solution containing sodium cations, hydroxyl anions and aluminate and/or silicate anions present in such concentration that upon reaction the mixed zeolite has said 2.2/1.0 molecular ratio of silica/alumina.

In a batch preparation method after the particles have been converted to zeolites they may be separated from the spent treating solution by decanting off the spent solution or by using any other well known method of separating a solid phase from a liquid phase. It is possible to convert the solid particles to zeolites in a continuous process wherein the solid refractory oxide particles and fresh treating solution are continuously introduced into a contactor while spent treating solution and mixed type zeolites are continuously withdrawn from said contactor. It is also possible to have a semi-continuous process such as that in which the treating solution is circulated from one tank to another, each tank containing solid particles at various stages of conversion to mixed type zeolites. These and other well known methods of contacting the treating solution with the solid particles will be apparent to one skilled in the art. It is also possible to use elevated pressures during the contacting step in order to accelerate the conversion of the refractory oxide particles to the mixed type zeolite particles.

Recently, the incorporation of a metal catalyst within the pore structure of a molecular sieve has been disclosed. The zeolites produced from the method of this invention are a preferable carrier or support for the metal catalysts because of their size, shape and uniformity. Spherically shaped catalyst particles are preferable since reactants passing through a fixed bed of catalyst will pass over a more uniformly packed bed thereby reducing channelling and allowing more efficient contact between said reactants and the catalyst. Furthermore the uniformity, the surface area and the density of the catalyst particles are more easily controlled. As an example, spherical zeolites may be prepared as described herein and an active catalytic ingredient impregnated on the finished zeolite. Specifically, a solution containing the active metal cations such as platinum in the form of chloroplatinic acid is contacted with the calcium 5A–10X zeolites, the excess liquid driven off and the particles thereupon oxidized to form the desired platinum impregnated zeolite. These catalysts have the unique feature of causing reactions to occur on selective components of a mixture of possible reactants such as on the normal hydrocarbons in a hydrocarbon mixture since only said normals can enter the pore structure because of the molecular size of the normals and the size of the pore entrance diameters.

The concentration of each type of zeolite present within the zeolite particle is determined by the oxide ratio of the $SiO_2/Al_2O_3$ and the oxide ratio of $M_{2/n}O/Al_2O_3$ where M is at least 1 cation having a valence of not more than 3 and $n$ represents the valence of M. The finished zeolite may be tailor-made for a particular application by controlling the concentrations of each type. This is easily accomplished by variations in the anion and cation concentrations in the treating solution as well as by variations in the refractory oxide particles themselves.

The following examples are introduced for the purpose of further illustrating the novelty and utility of the present invention but not with the intention of limiting the same.

EXAMPLE I

Silica hydrogel spheres prepared by dropping a silica sol into forming oil, are aged in forming oil at 95° C., water washed to remove neutralization salts, dried at 125° C. and calcined at 650° C.

One hundred grams of the calcined silica spheres of $\frac{1}{32}$ inch diameter are introduced into a glass flask. Sufficient sodium aluminate and sodium hydroxide are dissolved in an aqueous solution to give a $SiO_2/Al_2O_3$ weight ratio of 65/35 and a $Na_2O/Al_2O_3$ mole ratio of 1.82 when mixed wiht the silica spheres. The aqueous treating solution is introduced into said glass flask whereupon the mixture is aged for 24 hours at 95° C. The resulting spheres are then separated from the spent aqueous solution and dried.

The resulting dried zeolite spheres are placed on a Büchner funnel. A finishing solution containing 120 grams of calcium chloride in 1.5 liters of water is slowly passed once through said Büchner funnel at a rate of 0.75 liters per hour and at a temperature of 25° C. The resulting ion-exchanged spheres are water washed with distilled water until the wash effluent is chloride free and thereupon dried at 150° C.

Twenty grams of the calcium ion-exchanged zeolites prepared from the above procedure are introduced into a vessel and purged with nitrogen until the pores of the zeolite contain substantially all nitrogen. Fifty cc. of 2,2,4-trimethylpentane is added to the vessel completely covering the zeolite and displacing the nitrogen from the void spaces between the zeolite particles. After complete displacement of the void spaces, an additional 72 cc. of nitrogen is evolved from the pore space within the zeolite particle. The system is allowed to come to equilibrium whereupon 5 cc. of technical grade normal hexane is added to the vessel. The trimethylpentane molecules are small enough to pass into the 10X pore structure but are too large to pass into the 5A pore structure whereas the normal hexane is small enough in molecular cross section to pass into the 5A pore structure. After adding the normal hexane to the vessel and allowing the system to come to equilibrium, an additional 94 cc. of nitrogen are evolved. It is estimated from these numbers that the ratio of Type A to Type X for the above prepared calcium ion-exchanged zeolite spheres is about 56.5 to about 43.5.

Another portion of the above prepared calcium exchanged zeolite spheres was analyzed by X-ray powder diffraction analysis and the results are presented in column 1 of Table 1 along with the diffraction pattern for Type A and Type X. It is estimated that the ratio of the concentration of Type A to Type X in said sphere is about 59 to about 41 based upon the relative intensity of the d value of the strongest line for Type A compared to the strongest line for Type X.

TABLE 1

| Column 1 Example I Zeolite | | Column 2 Type A Zeolite | | Column 3 Type X Zeolite | |
|---|---|---|---|---|---|
| dA | I/I₀ | dA | I/I₀ | dA | I/I₀ |
| 14.0±0.5 | S* | | | 14.5 | 100 |
| 12.0±0.2 | S | 12.2 | 100 | | |
| 8.7±0.2 | S | 8.66 | 40 | 8.84 | 60 |
| 7.5±0.1 | W | | | 7.56 | 60 |
| 7.1±0.1 | M | 7.08 | 30 | | |
| 6.1±0.1 | VW | 6.12 | 12 | | |
| 5.8±0.1 | M | | | 5.74 | 80 |
| 5.5±0.1 | M | 5.48 | 20 | | |
| 5.0±0.05 | W | 5.00 | 4 | | |
| 4.8±0.05 | W | | | 4.81 | 40 |
| 4.4±0.05 | WM | | | 4.42 | 60 |
| | | | | 4.20 | 1 |
| 4.08±0.05 | S | 4.08 | 35 | | |
| 3.95±0.02 | S | | | 3.954 | 10 |
| | | 3.875 | 2 | | |
| 3.80±0.02 | S | | | 3.813 | 60 |
| | | | | 3.769 | 20 |
| 3.70±0.02 | S | 3.690 | 35 | | |
| | | 3.539 | 4 | 3.621 | 1 |
| | | | | 3.515 | 1 |
| 3.40±0.02 | M | 3.398 | 18 | | |
| 3.28±0.02 | S | 3.276 | 40 | 3.36 | |
| | | | | 3.25 | |
| 3.18±0.02 | VW | | | | |
| 3.03±0.02 | VW | | | 3.048 | 40 |
| 2.96±0.02 | S | 2.972 | 30 | 2.941 | 40 |
| 2.87±0.02 | S | 2.888 | 10 | 2.881 | 80 |
| 2.78±0.01 | W | | | 2.790 | 40 |
| 2.74±0.01 | W | 2.741 | 8 | 2.745 | 10 |
| 2.66±0.01 | W | 2.676 | 4 | 2.725 | 5 |
| 2.60±0.01 | S | 2.614 | 25 | 2.622 | 40 |
| | | | | 2.617 | 20 |
| 2.51±0.01 | W | 2.502 | 8 | 2.545 | 20 |
| 2.44±0.01 | W | 2.451 | 8 | | |
| 2.39±0.01 | W | 2.359 | 4 | 2.403 | 40 |
| and several more lines | | and several more lines | | and several more lines | |

*S=strong, M=medium, WM=weak medium, W=weak, VW=very weak.

EXAMPLE II

Twenty grams of calcium ion-exchanged 5 angstrom Type A zeolites are introduced into a vessel and purged with nitrogen until all the pores of the zeolite contain substantially all nitrogen. Fifty cc. of 2,2,4-trimethylpentane is added to the vessel completely covering the zeolite and displacing the nitrogen from the void spaces between the zeolite particles. After complete displacement of the void spaces an additional 2 cc. of nitrogen is evolved from the pore space within the zeolite particles. The system is allowed to come to equilibrium whereupon 5 cc. of technical grade normal hexane is added to the vessel and an additional 170 cc. of nitrogen are evolved after the system has again equilibrated.

EXAMPLE III

Calcined silica spheres are prepared as described in Example I. One hundred grams of the calcined silica spheres of 1/32 inch diameter are introduced into a glass flask. Sufficient sodium aluminate and sodium hydroxide are dissolved in an aqueous solution to give a $SiO_2/Al_2O_3$ weight ratio of 55/45 and a $Na_2O/Al_2O_3$ mole ratio of 1.5 when mixed with the silica spheres. The aqueous treating solution is introduced into said glass flask whereupon the mixture is aged for 69 hours at 95° C. The resulting spheres are separated from the spent aqueous solution, dried, ion exchanged with a calcium chloride solution as described in Example I, water washed and finally dried.

Twenty grams of the resulting calcium ion-exchanged zeolite are introduced into a vessel and purged with nitrogen until the pores of the zeolite contain substantially all nitrogen. Fifty cc. of 2,2,4-trimethylpentane is added to the vessel completely covering the zeolite and displacing the nitrogen from the void spaces between the zeolite particles. After complete displacement of the void spaces an additional 20 cc. of nitrogen is evolved from the pore space within the zeolite particle. The system is allowed to come to equilibrium and 5 cc. of technical grade normal hexane is thereupon added to the vessel. After adding the normal hexane to the vessel and allowing the system to come to equilibrium an additional 160 cc. of nitrogen are evolved. It is estimated that the above prepared calcium ion-exchanged zeolite spheres have a ratio of Type A to Type X of 88.7 Type A to 11.3 Type X sieve.

It should be noted from the foregoing examples that the iso-compound (trimethylpentane) displaced 72 cc. in the mixed type Example I zeolite, only 2 cc. in the Type A Example II zeolite and 20 cc. from the mixed type Example III zeolite which is a direct indication of the amount of Type X structure present within the zeolite particles. The iso-compound can pass into the Type X structure and displace nitrogen therefrom but is unable to penetrate the Type A structure. In addition an independent check on the ratio of Types A and X by X-ray diffraction analysis confirms the concentrations described hereinbefore.

I claim as my invention:

1. A method of preparing a synthetic zeolite particle free of extraneous binder and having a predetermined size and shape and containing both a Type A and a Type X zeolite structure within said particle which comprises:
   preparing a solid refractory inorganic oxide particle of said size and shape whose composition is selected from the group consisting of silica and alumina,
   bringing said particle into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said refractory oxide and said treating solution,
   maintaining said particle in contact with said treating solution at a temperature of from about 25° to about 150° C. and for a time sufficient to substantially convert said particle to a zeolite particle of approximately said size and shape and containing both a Type A structure and Type X structure,
   and separating the zeolite particle from the treating solution.

2. A synthetically prepared zeolite particle free of extraneous binder and having a Type A structure and a Type X structure incorporated within said particle.

3. A crystalline synthetic material having a composition expressed in terms of oxides as follows:

$$0.95 \pm 0.2\ M_{2/n}O : Al_2O_3 : 2.2 \pm 0.5\ SiO_2 : YH_2O$$

wherein M represents at least one cation having a valence of not more than 3, $n$ represents the valence of M, and Y may be any value up to about 8, the atoms of said material being arranged in a unit cell in such a manner that the X-ray powder diffraction pattern of the material is essentially the same as that shown in column 1 of Table 1.

4. A method for the preparation of synthetic zeolite particles free of extraneous binder and of a predetermined size and shape and each such particle having more than one effective pore entrance diameter which comprises:
   preparing solid refractory oxide particles of said size and shape comprising an oxide selected from the group consisting of silica and alumina,
   bringing said particles into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said solid refractory oxide and said treating solution,
   maintaining said particles in contact with said treating solution at a temperature of from about 25° to about 150° C. and for a time sufficient to substantially convert said particles to zeolite particles each containing a plurality of different sized uniform pore entrance diameters,
   and separating the zeolite particles from the treating solution.

5. The method of claim 4 further characterized in that the alkali metal is selected from the group consisting of sodium and potassium.

6. The method of claim 4 further characterized in that the resulting zeolite particles are ion exchanged with calcium such that at least a portion of the alkali metal cations are ion exchanged with calcium ions to change the effective pore entrance diameter of said particles.

7. A method for preparing a synthetic zeolite particle free of extraneous binder and having a predetermined size and shape and at least 2 different sized uniform pore entrance diameters within said particle which comprises:
   preparing a solid alumina particle of said size and shape,
   bringing said particle into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said solid alumina and said treating solution,
   maintaining said particle in contact with the treating solution at a temperature of from about 25° to about 150° C. and for a time sufficient to substantially convert said particle to a zeolite particle of approximately said size and shape having at least 2 different sized pore entrance diameters, and separating the zeolite particle from the treating solution.

8. A method for preparing a synthetic zeolite particle free of extraneous binder and having a predetermined size and shape and at least 2 different sized uniform pore entrance diameters within said particle which comprises:

preparing a solid silica particle of said size and shape, bringing said particle into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said solid silica and said treating solution, maintaining said particle in contact with the treating solution at a temperature of from about 25° to about 150° C. and for a time sufficient to substantially convert said particle to a zeolite particle of approximately said size and shape having at least 2 different sized pore entrance diameters, and separating the zeolite particle from the treating solution.

9. A method for preparing a synthetic zeolite particle free of extraneous binder and having a predetermined size and shape and at least 2 different sized uniform pore entrance diameters within said particle which comprises:

preparing a solid silica-alumina particle of said size and shape, bringing said particle into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said solid silica-alumina and said treating solution, maintaining said particle in contact with the treating solution at a temperature of from about 25° to about 150° C. and for a time sufficient to substantially convert said particle to a zeolite particle of approximately said size and shape having at least 2 different sized pore entrance diameters, and separating the zeolite particle from the treating solution.

10. A method of preparing a synthetic zeolite particle free of extraneous binder and of a substantially spherical shape having at least 2 different sized uniform pore entrance diameters within said particle which comprises:

preparing a solid refractory inorganic oxide particle of said spherical shape comprising an oxide selected from the group consisting of silica and alumina, bringing said particle into contact with an aqueous treating solution having a pH greater than about 10 and containing alkali metal cations and anions selected from the group consisting of hydroxyl, silicate and aluminate, the composition of said treating solution being established in relation to the original composition of said particle to provide a $SiO_2/Al_2O_3$ weight ratio of from about 65/35 to about 55/45 and an alkali metal oxide/$Al_2O_3$ mole ratio of from about 1.5 to about 1.8, said ratios being based on the aggregate of said solid refractory oxide and said treating solution, maintaining the particle in contact with the treating solution at a temperature of from about 25° to about 150° C. and for a time sufficient to substantially convert said particle to a zeolite particle of said spherical shape containing at least two different sized uniform pore entrance pore diameters, and separating the zeolite particle from the treating solution.

11. The method according to claim 10 further characterized in that after the spherical zeolite particle has been formed at least a portion of the sodium cations thereof are ion exchanged with calcium cations to change the effective sizes of the pore entrance diameters.

12. A binderless substantially spherical shaped zeolite particle having incorporated therein at least 2 different sized uniform pore entrance diameters.

13. The particle of claim 12 further characterized in that it has 2 different sized pore entrance diameters, one being about 5 angstroms and the other being about 10 angstroms.

14. A substantially spherically shaped catalyst particle comprising a mixed type zeolite support particle prepared by the method of claim 10 and at least one active catalytic ingredient impregnated thereon.

References Cited

UNITED STATES PATENTS

| | | | |
|---|---|---|---|
| 2,882,243 | 4/1959 | Milton | 252—455 |
| 2,882,244 | 4/1959 | Milton | 252—455 |
| 3,058,805 | 10/1962 | Weber | 23—113 |
| 2,971,904 | 2/1961 | Gladrow et al. | 252—455 |
| 3,200,083 | 8/1965 | Milton | 252—455 |
| 3,238,123 | 3/1966 | Voorhies et al. | 252—455 |
| 3,250,728 | 5/1966 | Miale et al. | 252—455 |

DANIEL E. WYMAN, *Primary Examiner.*

C. F. DEES, *Assistant Examiner.*